Nov. 2, 1965                L. F. GRANTHAM                3,215,253
VIBRATION-DAMPENING SUPPORT FOR A ROLLER-TYPE CONVEYOR
Filed Nov. 19, 1962                              2 Sheets-Sheet 1
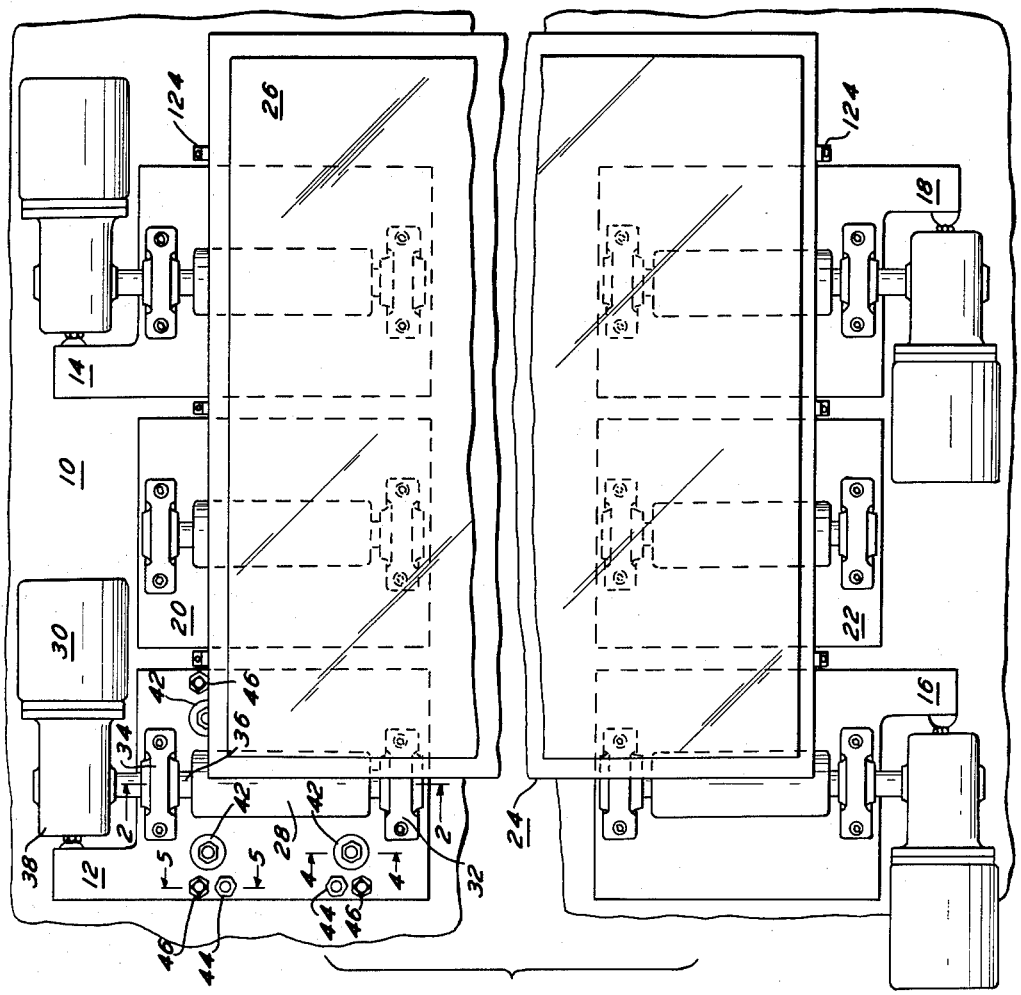
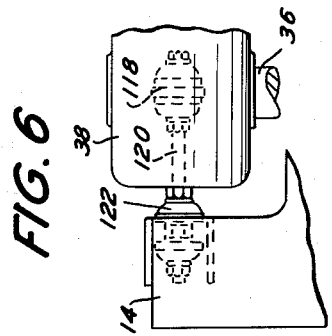
INVENTOR.
LYNN F. GRANTHAM
BY Arthur H. Seidel
ATTORNEY

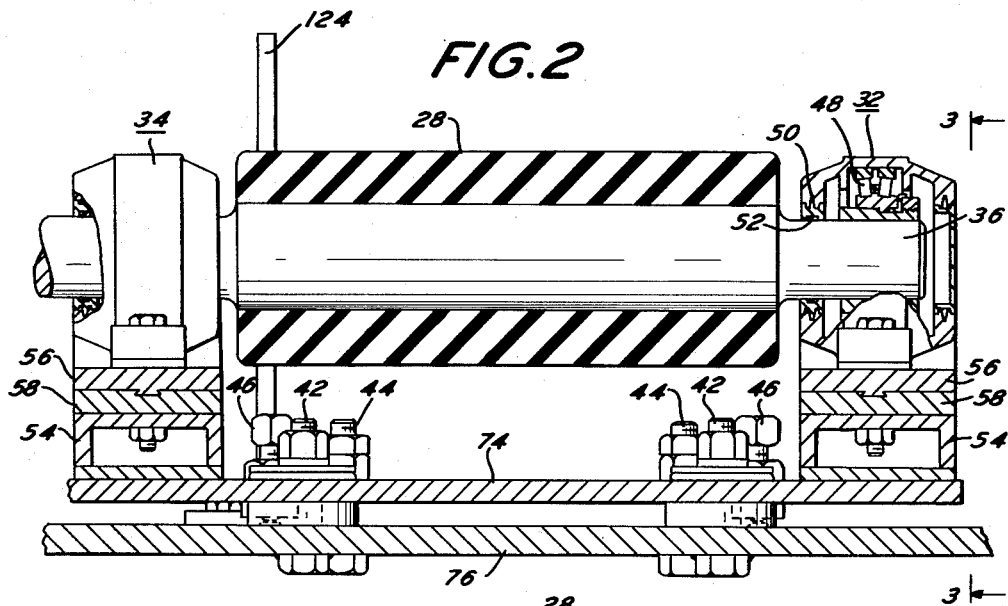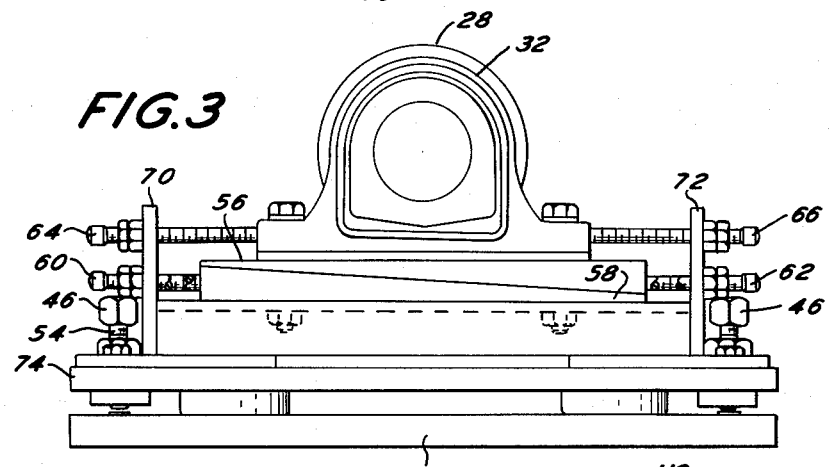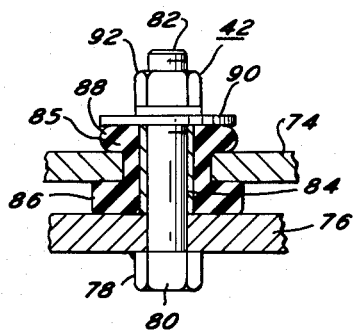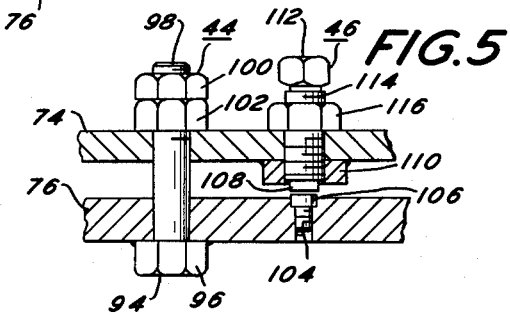

United States Patent Office 3,215,253
Patented Nov. 2, 1965

3,215,253
VIBRATION-DAMPENING SUPPORT FOR A ROLLER-TYPE CONVEYOR
Lynn F. Grantham, Springfield, Pa., assignor to Baldwin-Lima-Hamilton Corporation, Philadelphia, Pa., a corporation of Pennsylvania
Filed Nov. 19, 1962, Ser. No. 238,490
4 Claims. (Cl. 198—127)

This invention relates to conveyors and, more particularly, to return conveyors for moving finishing tables used in transporting plate glass which is to be ground and polished.

In the manufacture of plate glass, after rough plate glass has been deposited on finishing tables by methods known in the art, these tables are moved slowly along a well-supported precision guideway where the glass is ground and polished. The guideway is from 600 to 1200 feet long depending upon the capacity of the plant and approximately 100 feet on each end are used for loading and unloading the glass.

The finishing tables are made of a special cast iron and are very rigid and heavy with a smooth top finish for the glass and have machined guide members on the bottom thereof for engagement with the guideway.

When the finishing tables have passed through the guideway, they may be unloaded or, in the alternative, may be returned to the entrance of the guideway where the glass will be removed or turned over to grind and polish the other side thereof. These loaded or unloaded finishing tables are returned to the beginning of the guideway by a roller-type conveyor in which each second roller of the conveyor is individually driven by an electric motor of controlled matching speed. Each table is supported by three to four rollers under each of its twelve foot long sides.

Because of the weight of the tables and the smoothness with which they have to travel over the conveyor rollers, special care must be exercised so that the rollers give shockless and uniform support for the tables as they pass over them. Additionally, the conveyor assembly must be capable of moving the finishing tables around corners in an arcuate path.

The need for shockless and uniform support for the tables is accentuated when the tables are transporting plate glass which has been finished on only one side. The glass is extremely fragile and any shock between the engagement of a roller with the table could cause breakage of the glass.

It is the general object of this invention to provide a new and improved conveyor.

Another object of this invention is to provide a better conveyor for returning finishing tables used in transporting plate glass.

A still further object of this invention is to provide a new and improved conveyor which will pass a finishing table from one roller to another without causing shock between the engagement of a roller with the table.

Another object of this invention is to provide a new and improved conveyor for finishing tables which will give uniform shockless support and is capable of moving the tables in an arcuate path.

Other objects will appear hereinafter.

For the purpose of illustrating the invention, there is shown in the drawings a form which is presently preferred; it being understood, however, that this invention is not limited to the precise arrangements and instrumentalities shown.

FIGURE 1 is a top plan view of a portion of a conveyor built in accordance with the principles of the present invention with a finishing table in place.

FIGURE 2 is a cross sectional view of one of the roller units taken along lines 2—2 in FIGURE 1.

FIGURE 3 is an end view of the roller unit shown in FIGURE 2 taken from the direction of lines 3—3 in FIGURE 2.

FIGURE 4 is a cross sectional view of one of the cushion supports shown in FIGURE 1 taken along lines 4—4.

FIGURE 5 is a cross sectional view of the limit stops shown in FIGURE 1 taken along lines 5—5.

FIGURE 6 is an exploded view of the shock and torque absorption attachment for the roller motors shown in FIGURE 1.

In FIGURE 1, there is shown a top plan view of six rollers forming a portion of a roller-type conveyor assembly 10 of the present invention. It will be understood that the actual conveyor has considerably more rollers to move a finishing table for plate glass from one end of a guideway to the other.

The conveyor 10 includes motor-driven roller units 12 and 14 on one side of the conveyor 10 and motor-driven roller units 16 and 18 on the other side thereof. In between motor-driven roller units 12 and 14, there is a freely supported roller 20 not driven by any motor. A similar roller 22 is placed between motor-driven roller units 16 and 18 on the other side of the conveyor 10.

In FIGURE 1, the means for positioning the supports for the rollers have been omitted for purposes of clarity. Additionally, only motor-driven roller unit 12 has been described in detail, it being understood that the operation of the other motor-driven roller units 14, 16 and 18 is substantially similar.

The conveyor 10 is adapted to transport a finishing table 24 along the length thereof. The conveyor will move either an unloaded finishing table 24 or one that has a sheet of plate glass 26 thereon which will be unloaded at the end of the conveyor. The tables 24 are made of special cast iron and are very rigid and heavy with a smooth top finish for the glass. The table 24 also has a machined guide member centrally located on the bottom thereof (not shown). The machined guide members form no part of the present invention.

The motor-driven roller unit 12 consists of a straight roll 28 driven by a motor 30. It is to be understood that the motor 30 has its speed matched with the speed of every other motor in the conveyor 10. The roller 28 is mounted between a floating pillow block 32 with a closed end and a fixed pillow block 34 with an open end on a shaft 36. The shaft 36 passes through the open end pillow block 34 to be driven by the worm gear equipped motor 30 which is supported on bearings 38. Within the pillow blocks 32 and 34 are roller bearings for supporting the shaft 36 in a manner to be discussed below.

The pillow blocks 32 and 34 are mounted on a common support plate 74 over a floor-mounted support 76.

The lining up and load distribution over the six to eight rollers under a given finishing table against unavoidable installation irregularities is a problem solved by this invention. Therefore, each roller support plate 74 is mounted in four rubber cushion supports 42 to the floor-mounted support 76. The four rubber cushion supports 42 are equally spaced to give uniform support for the roller assembly. Additionally, four other bolts 44 fixed to floor support 76 and passing through the common support plate 74 are used to confine the rubber cushion supports 42 to a preloaded condition. This preloaded force is just sufficient to carry the normal vertical load at that point.

In addition, four adjustable clearance gaps 46 are provided to determine a desired minimum spacing between common support 74 and floor-supported support plate 76.

In FIGURE 2, the closed end floating pillow block 32 has been partially sectionalized to show the structure thereof. The pillow block consists of roller bearings 48 which support for free rotation the shaft 36. Additionally, there are provided frictionless supports for the shaft at the open end of the pillow block consisting of a neoprene insert 50 with a Dacron O-ring 52 in engagement with the shaft 36. Other materials which will give frictionless support to the shaft might be utilized as substitutes for the neoprene and Dacron used in the pillow block.

The pillow blocks 32 and 34 are vertically and horizontally adjustable by the provision of a support 54 on which are mounted dovetailed wedges 56 and 58. The position of wedges 56 is controlled by adjustable screws 62 and the position of wedges 58 is controlled by screws 60. The pillow blocks 32 and 34 are supported against movement in the direction of rolling by suitable screws 64 and 66. The screws 60 and 64 are mounted on a support member 70 attached to the common support plate 74, and the screws 62 and 66 are mounted on a support plate 72 secured to the common support plate 74. As stated previously, the wedges 56 and 58, support 54, screws 60, 62, 64 and 66, and support plates 70 and 72 have been omitted from the showing in FIGURE 1 for the purposes of clarity.

In FIGURE 4, there is shown a cross sectional view of one of the four cushion support bolts 42. As shown, the cushion support consists of a bolt 78 having its head 80 fixedly secured to the bottom of the floor support 76 with its shaft 82 passing through openings in the floor support 76 and the common support 74. A central sleeve 84 is provided around the shaft 82. Surrounding the sleeve 84 is a rubber cushion member 85 which acts as a horizontal thrust cushion for the thrust of the motor-driven roller 28 against the floor support 76. The rubber cushion member 85 has lower 86 and upper 88 cushion portions.

The lower rubber cushion portion 86 is preloaded by bolt 44 to be discussed below. This preload is just sufficient to carry the normal vertical load at the particular point on the conveyor roller. The upper cushion portion 88 is also vertically preloaded in its shown contours by washer 90 held in place by bolt 92 on shaft 82. This upper vertical preloading absorbs any sudden upward motion of the roller 28 and the common support plate 74 when the roller leaves the trailing end of the table 24. The natural flexibility and dampening characteristics of the rubber cushions are thus employed to obtain the smoothness and load distribution required for the conveyor.

The preloading bolt assembly 44 is best shown in FIGURE 5. The assembly 44 consists of a bolt 94 having its head 96 fixedly secured to the bottom of floor support 76 with its shafts 98 passing through floor support 76 and common support 74. Two nuts 100 and 102 are threadedly engaged with shaft 98 to force common support plate 74 downward and increase the vertical preload on the lower cushion portion 86 discussed previously.

The adjustable contact assembly 46 consists of a lower contact 106 having a threaded shaft 104 fixedly secured to the floor support 76. An upper contact 108 is spaced from lower contact 106 and mounted on a nut 110 welded to the bottom of common support 74. The upper contact 108 is adjusted by a bolt 112 having its shaft 114 integral with the contact 108. The shaft 114 passes through a nut 116 secured to the upper portion of base plate 74. In this manner, the spacing between upper and lower contacts 108 and 106 can be adjusted by turning bolt 112.

In order to restrict the motor drive torque reaction, a support 118 shown in FIGURE 6 is attached to the motor housing and is anchored to the common support plate 74 at point 122 through a rod connection 120. Rod 120 and support 122 are rubber cushioned and will therefore absorb any sudden shock torque that could occur when a table begins to be engaged by the roller while the motor speed adjusts itself from unloaded to a loaded r.p.m. This type of drive arrangement is well-known in the art and does not form a part of the present invention.

The operation of the conveyor of the present invention is as follows:

The purpose of the assemblies 42, 44 and 46 is to limit the engagement shock between the table and roller. This is important because of the fragility of the plate glass which has been ground on only one side at the stage of manufacture when the finishing table is moved along the conveyor. The procedure of setting up the roller consists of (1) placing a table 24 without glass on the rollers with the nuts 100, 102 and 92 tightened down to preload upper and lower portions 86 and 88. These nuts are adjusted so that the common support plate 74 cannot move upwards if the edge of the table 24 releases the roller 28. (2) Bolt 112 is adjusted so that contacts 108 have a clearance gap with lower contact 106 of a desired amount. This desired amount in one embodiment of the present invention was between .03 and .07 inch. After the adjustments (1) and (2) have been made, a table carrying a glass plate will depress the rubber springs an additional amount. In the specific embodiment discussed above, this amount was .015 inch as the table touches the roller. However, as the center of gravity of the table 24 approaches the roller 28, it will deflect the roller a greater amount. This increase in deflection is limited by the abutting contacts 108 and 106 so that the next roller 28 is not touched by the table edge at an excessive tangential angle. Thus, there is shockless movement of the finishing table from one roller to another.

For different weights (thicknesses) of plate glass, the abutment gaps can be adjusted to keep the shock or roller engagement with the table edge to a minimum.

It can easily be seen that the conveyor of the present invention can be utilized to move a finishing table in an arcuate path. This is accomplished by providing tapered rolls. The table 24 is guided against lateral movement by suitable guide members 124. It will be understood that any suitable guide members might be utilized to prevent sideways movement of the table 24.

It will also be understood that if the conveyor is adapted to move finishing tables without plate glass, no provision will be made during the adjustment for the additional weight of the plate glass.

The present invention may be embodied in other specific forms without departing from the spirit or essential attributes thereof and, accordingly, reference should be made to the appended claims, rather than to the foregoing specification as indicating the scope of the invention.

I claim:

1. Conveyor apparatus comprising a load supporting conveyor roller, a fixed support means, a support plate for the conveyor roller mounted for movement relative to said fixed support means, shock absorbing means between said fixed support means and support plate, adjustable means located on said fixed support means and said support plate for limiting the movement of said support plate relative to said fixed support means, said shock absorbing means including first symmetrically spaced cushions between said support plate and fixed support means for absorbing relative movement of said support plate towards said fixed support means, symmetrically spaced cushions mounted on said support plate for absorbing relative movement of said support plate away from said fixed support means, means for moving said support plate towards and away from said fixed support means to preload said first symmetrically spaced cushions, and means for independently moving said second symmetrically spaced cushions towards and away from said support plate to preload said second symmetrically spaced cushions, wherein said first symmetrically spaced cushions and said second symmetrically spaced cushions being formed of integral cushions passing through said support plate and overlapping the top and bottom faces thereof, the central portion of said integral cushions being adapted to provide a horizontal thrust cushion for said fixed support means.

2. Apparatus in accordance with claim 1 wherein said adjustable means includes a plurality of pairs of adjustable abutment contacts symmetrically spaced between said support plate and fixed support means.

3. A conveyor apparatus comprising a load supporting conveyor roller, a fixed support means, a support plate for the conveyor roller mounted for movement relative to said fixed support means, shock absorbing means between said fixed support means and support plate, adjustable means located on said fixed support means and said support plate for limiting the movement of said support plate relative to said fixed support means, said shock absorbing means including first symmetrically spaced cushions between said support plate and fixed support means for absorbing the relative movement of said support plate toward said fixed support means, second symmetrically spaced cushions mounted on said support plate for absorbing sudden movement of said support plate away from said fixed support means, means for moving said support plate towards and away from said fixed support means to preload said first symmetrically spaced cushions and means for independently moving said second symmetrically spaced cushions towards and away from said support plate to preload said second symmetrically spaced cushions.

4. Apparatus in accordance with claim 3 including roller support means for absorbing shock torque on said roller, said roller support means being fixedly secured to said support plate.

References Cited by the Examiner
UNITED STATES PATENTS

| 1,892,943 | 1/33 | Geyer | 248—358 |
| 2,234,162 | 3/41 | Anderson | 198—127 |
| 2,777,032 | 1/57 | Burch. | |

FOREIGN PATENTS

| 445,445 | 4/36 | Great Britain. |

SAMUEL F. COLEMAN, *Primary Examiner.*

WILLIAM B. LABORDE, ERNEST A. FALLER,
*Examiners.*